US010380790B2

(12) United States Patent
Yang et al.

(10) Patent No.: US 10,380,790 B2
(45) Date of Patent: Aug. 13, 2019

(54) SYSTEM AND METHODS FOR GENERATING PROCEDURAL WINDOW LIGHTING EFFECTS

(71) Applicant: Robert Bosch GmbH, Stuttgart (DE)

(72) Inventors: Lei Yang, Cupertino, CA (US); Liu Ren, Cupertino, CA (US); Jennifer Chandler, Davis, CA (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/537,820

(22) PCT Filed: Dec. 22, 2015

(86) PCT No.: PCT/US2015/067474
§ 371 (c)(1),
(2) Date: Jun. 19, 2017

(87) PCT Pub. No.: WO2016/106365
PCT Pub. Date: Jun. 30, 2016

(65) Prior Publication Data
US 2017/0372512 A1 Dec. 28, 2017

Related U.S. Application Data

(60) Provisional application No. 62/095,419, filed on Dec. 22, 2014.

(51) Int. Cl.
*G06T 15/00* (2011.01)
*G06T 15/50* (2011.01)
(Continued)

(52) U.S. Cl.
CPC .......... *G06T 15/506* (2013.01); *G06T 15/005* (2013.01); *G06T 15/04* (2013.01);
(Continued)

(58) Field of Classification Search
CPC ....... G06T 15/506; G06T 15/04; G06T 19/20; G06T 15/005; G06T 2210/04; G06T 2210/62; G06T 2219/2012
(Continued)

(56) References Cited

U.S. PATENT DOCUMENTS 8,705,843 B2 * 4/2014 Lieckfeldt ............... G06T 15/04
382/154
9,244,589 B2 * 1/2016 Thornberry ........ G06K 9/00637
(Continued)

OTHER PUBLICATIONS

Joseph NM, Achorn B, Jenkins SD, Driskill H. Visualizing building interiors using virtual windows. In SIGGRAPH Asia 2014 Technical Briefs Nov. 24, 2014 (p. 18). ACM.*
(Continued)

*Primary Examiner* — Phu K Nguyen
(74) *Attorney, Agent, or Firm* — Maginot Moore & Beck LLP

(57) ABSTRACT

A method of rendering a three-dimensional building with window effects has been developed. The method comprising: reading a building facade texture for the three-dimensional building from a memory; identifying room boundaries or floor boundaries within the building facade texture based on window areas of the building facade texture; generating a window lighting layer for the building facade texture using the identified room boundaries or floor boundaries; generating a modified building facade texture having window effects by combining the window lighting layer with the building facade texture using a window transparency cutout layer, the modified building facade texture being configured such that the window lighting layer can be seen only through the window areas of the building facade texture; and rendering images of the three-dimensional building using the modified building facade texture. A system having a display,
(Continued)

a memory, and a processor for performing the method has also been developed.

12 Claims, 10 Drawing Sheets

(51) Int. Cl.
    *G06T 15/04*         (2011.01)
    *G06T 19/20*         (2011.01)

(52) U.S. Cl.
    CPC .............. *G06T 15/50* (2013.01); *G06T 19/20* (2013.01); *G06T 2210/04* (2013.01); *G06T 2210/62* (2013.01); *G06T 2219/2012* (2013.01)

(58) Field of Classification Search
    USPC ........................................................ 345/418
    See application file for complete search history.

(56) References Cited

U.S. PATENT DOCUMENTS

| | | | |
|---|---|---|---|
| 9,520,000 B2* | 12/2016 | Freund | G06T 11/001 |
| 9,835,882 B2* | 12/2017 | Kunishima | H01L 23/53214 |
| 9,898,862 B2* | 2/2018 | Bhattacharya | G06T 19/003 |
| 9,933,254 B2* | 4/2018 | Thornberry | G06K 9/00637 |
| 9,953,112 B2* | 4/2018 | Schultz | G06F 17/5004 |
| 2006/0162276 A1 | 7/2006 | Coleman | |
| 2010/0202682 A1 | 8/2010 | Lieckfeldt | |
| 2011/0220299 A1 | 9/2011 | Berman et al. | |
| 2012/0249539 A1 | 10/2012 | Bhattacharya et al. | |
| 2014/0009468 A2 | 1/2014 | Mueller | |

OTHER PUBLICATIONS

Martin, Bernardino Dominguez, Ángel Luis García Fernández, and Francisco Ramón Feito Higueruela. "Semantic and topological representation of building indoors: an overview." In the Joint ISPRS Workshop on 3D City Modelling & Applications and the 6th 3D GeoInfo Conference, Wuhan, China. 2011.*

International Search Report corresponding to PCT Application No. PCT/US2015/067474, dated Apr. 19, 2016 (3 pages).

Dongen, J.; Interior Mapping, A new technique for rendering realistic buildings; Computer Graphics International 2008 Conference Proceedings; 2008 (8 pages).

Musialski, P. et al.; A Survey of Urban Reconstruction; Eurographics 2012 State of the Art Report; 2012 (28 pages).

Smelik, R. et al.; A Survey on Procedural Modeling for Virtual Worlds; Computer Graphics Forum 33, 6, 31-50; Jan. 15, 2014 (20 pages).

Partial Supplementary European Search Report in corresponding EP patent application No. 15 874 336.9, dated Aug. 13, 2018 (20 pages).

Shamus Young, "Procedural City," available at: http://shamusyoung.com/twentysidedtale/?p=2940, Apr. 14, 2009 (24 pages).

Schwarz et al., "Procedural Design of Exterior Lighting for Buildings with Complex Constraints," ACM Transactions on Graphics (TOG), ACM, US, vol. 33, No. 5, Sep. 23, 2014 (16 pages).

Wonka et al., "Instant Architecture," ACM SIGGRAPH 2003 Papers, ACM US, 2 Penn Plaza, Suite 701, New York, NY, 10121-0701, USA, Jul. 1, 2003 (10 pages).

* cited by examiner

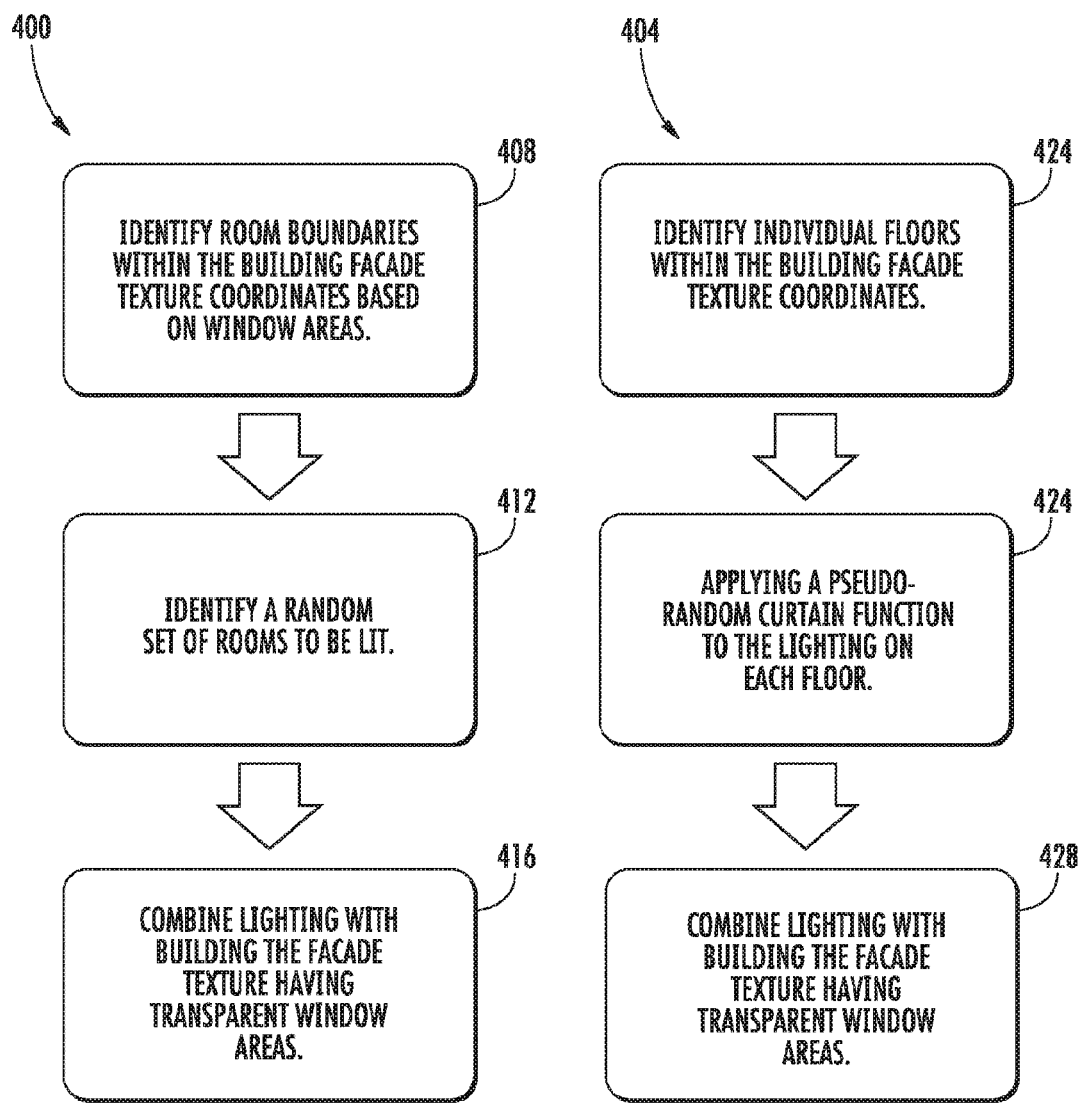

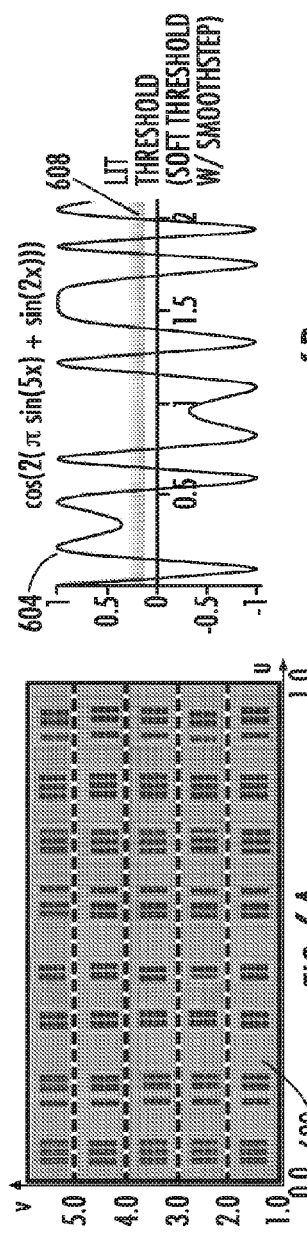
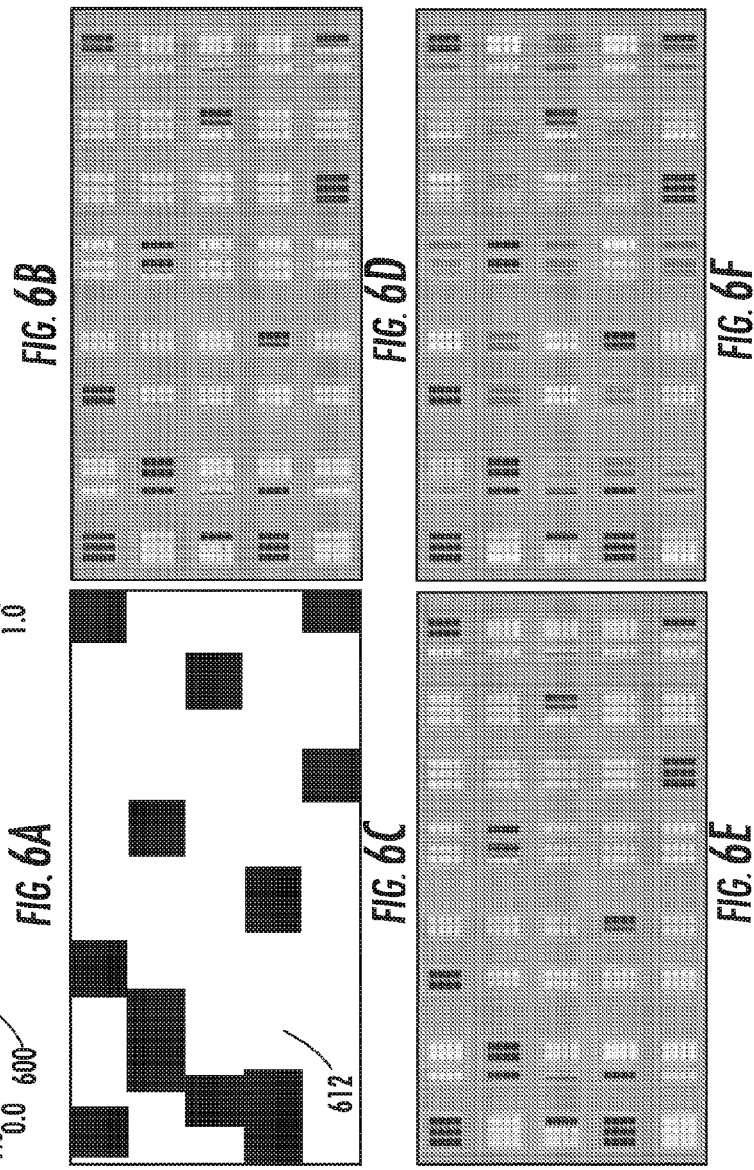
FIG. 6A  FIG. 6B  FIG. 6C  FIG. 6D  FIG. 6E  FIG. 6F

| 1000 | | | 1000 | | 1000 | | 1000 1004 |
|---|---|---|---|---|---|---|---|
| 0 | 0 | 0 | 0.375 | 0.375 | 0.625 | 0.625 | 0.625 |
| 0.375 | 0.375 | 0.375 | 0.25 | 0.35 | 0.375 | 0.375 | 0.375 |
| 0 | 0 | 0 | 1 | 1 | 2 | 2 | 2 |

SYSTEM AND METHODS FOR GENERATING PROCEDURAL WINDOW LIGHTING EFFECTS

This application is a 35 U.S.C. § 371 National Stage Application of PCT/US2015/067474, filed on Dec. 22, 2015, which claims the benefit of priority of U.S. provisional application Ser. No. 62/095,419, filed on Dec. 22, 2014, the disclosures of which is are herein incorporated by reference in its their entirety.

TECHNICAL FIELD

This disclosure relates generally to the field of computer graphics and, more specifically to systems and methods for generating window lighting and building interior effects.

BACKGROUND

Many modern software applications display three-dimensional representations of objects and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional graphics at depicting real-world environments and locations because the normal interaction between humans and the real-world occurs in three dimensions.

In many 3D graphics applications, buildings or city scenes may be depicted. In modern 3D graphics, the shape and structure of the buildings are formed by polygons. Rendered polygons typically receive one or more textures that simulate the appearance of a building in the real world by depicting features such as the material and color of the building's facade and structural details such as windows. In many embodiments, a texture is a two-dimensional drawing or photograph of the building that is applied to surfaces of the 3D rendered buildings to give them a more realistic appearance. A window transparency cutout layer may be applied to the texture to mark window areas as transparent. The window transparency cutout layer can either be provided by texture artists or generated automatically using computer vision algorithms [MUSIALSKI, P., WONKA, P., ALIAGA, D., WIMMER, M., VAN GOOL, L., PURGATHOFER, W. A Survey of Urban Reconstruction. Eurographics 2012 State of The Art Report].

In order to provide increased realism, some 3D graphics applications generate building interiors that can be seen through the windows of the 3D rendered buildings. Procedural or rule-based methods have been successful in synthesizing both exteriors and interiors of buildings in large-scale city scenes [SMELIK, R. M., TUTENEL, T., BIDARRA, R., AND BENES, B. 2014. A survey on procedural modelling for virtual worlds. Computer Graphics Forum 33, 6, 31-50.]. Such methods are capable of generating plausible geometry content for building shape, facades, and interior floor plans on very large scales with reasonable variance and detail. However, the synthesis of lighting effects for buildings and city scenes has been mostly overlooked. Window lighting and the revealed interior greatly affect the appearance of city scenes at different viewing scales, especially in nighttime or otherwise dark scenes. Generating these lighting effects has equal importance to the final rendering of the scenes as other geometry contents do.

Existing procedural building methods and tools can be used generate random room lighting and interior geometry to match the exterior of buildings. Such contents are usually represented by geometry primitives and are therefore static. In realistic visualization, lighting usually changes when time progresses (e.g. more room light will turn on in dark, and shut off at mid-night). Therefore each window light needs individual representation. Some of these data can be pre-computed and stored in textures, e.g. window light masks. Unfortunately such texture contents need extra space to be stored and cannot be easily shared among different window textures.

Moreover, the majority of existing building models, such as those used in Google earth, Apple maps, and various video games, do not possess interior geometry and lighting data. Such data are not trivial to generate automatically, since the semantic information associated with geometry may not be available. Buildings with irregular floor plan and room sizes make it difficult to infer the correct layout of interior geometry. Previous methods for generating these contents, such as Interior Mapping (discussed below), assume uniform or predefined grid size of interior structure, which cannot be easily generalized to arbitrary buildings in a large-scale city scene.

A related method, referred to as Interior Mapping, provides a type of parallax effect wherein a building interior can be viewed from different angles when only drawing a building facade [VAN DONGEN, J. 2008. Interior mapping: A new technique for rendering realistic buildings. In Computer Graphics International 2008 Conference Proceedings]. Interior mapping computes the intersection of the view ray with the planes of the room to determine an intersection point in world space which is then used to look up in a room texture. In the original method the building is parameterized in world space, generally with uniform spacing for rooms. The drawback of this approach is that a world space parameterization of the building requires knowledge of the dimensions of each building, and room spacing must be set individually for each building. For a large city environment with buildings acquired from an external data source, individual parameterization in world space may not be feasible. Accordingly, a more flexible approach to parameterizing rooms on a building facade would be beneficial.

SUMMARY

A method of rendering a three-dimensional building with window effects, the method comprising: reading, with a processor, a building facade texture for the three-dimensional building from a memory that is operably connected to the processor, the building facade texture including a window transparency cutout layer that marks window areas of the building facade texture as transparent; identifying, with the processor, at least one of room boundaries and floor boundaries within the building facade texture based on window areas of the building facade texture, the identified at least one of room boundaries and floor boundaries being unique two-dimensional texture-space coordinate ranges within the building facade texture that correspond to at least one of individual rooms and individual floors within the three-dimensional building; generating, with the processor, a window lighting layer for the building facade texture using the identified at least one of room boundaries and floor boundaries; generating, with the processor, a modified building facade texture having window effects by combining the window lighting layer with the building facade texture using the window transparency cutout layer, the modified building facade texture being configured such that the window lighting layer can be seen only through the window areas of the building facade texture; and rendering, with the processor, images of the three-dimensional building using the modified building facade texture.

A system for rendering a three-dimensional building with window effects, the system comprising: a display configured to display rendered images of the three-dimensional building; a memory configured to store program instructions and a building facade texture for the three-dimensional building, the building facade texture including a window transparency cutout layer that marks window areas of the building facade texture as transparent; and a processor operably connected to the display to send rendered images to the display and operable connected to the memory to read data from the memory, the processor being configured to execute the programming instructions to: read the building facade texture from the memory; identify at least one of room boundaries and floor boundaries within the building facade texture based on window areas of the building facade texture, the identified at least one of room boundaries and floor boundaries being unique two-dimensional texture-space coordinate ranges within the building facade texture that correspond to at least one of individual rooms and individual floors within the three-dimensional building; generate a window lighting layer for the building facade texture using the identified at least one of room boundaries and floor boundaries; generate a modified building facade texture having window effects by combining the window lighting layer with the building facade texture using the window transparency cutout layer, the modified building facade texture being configured such that the window lighting layer can be seen only through the window areas of the building facade texture; and render images of the three-dimensional building using the modified building facade texture.

BRIEF DESCRIPTION OF THE DRAWINGS

The foregoing aspects and other features of a system and method for generating window effects in urban scene rendering are explained in the following description, taken in connection with the accompanying drawings.

FIGS. 4*a-b* show facade parameterization processes for a window lighting component.

FIGS. 6*a-f* show building facades parameterized and lit using the process of FIG. 4*b*.

FIG. 10 illustrates the relationship between screen space derivatives and a change in world space and texture space coordinates.

DETAILED DESCRIPTION

Figure 1:
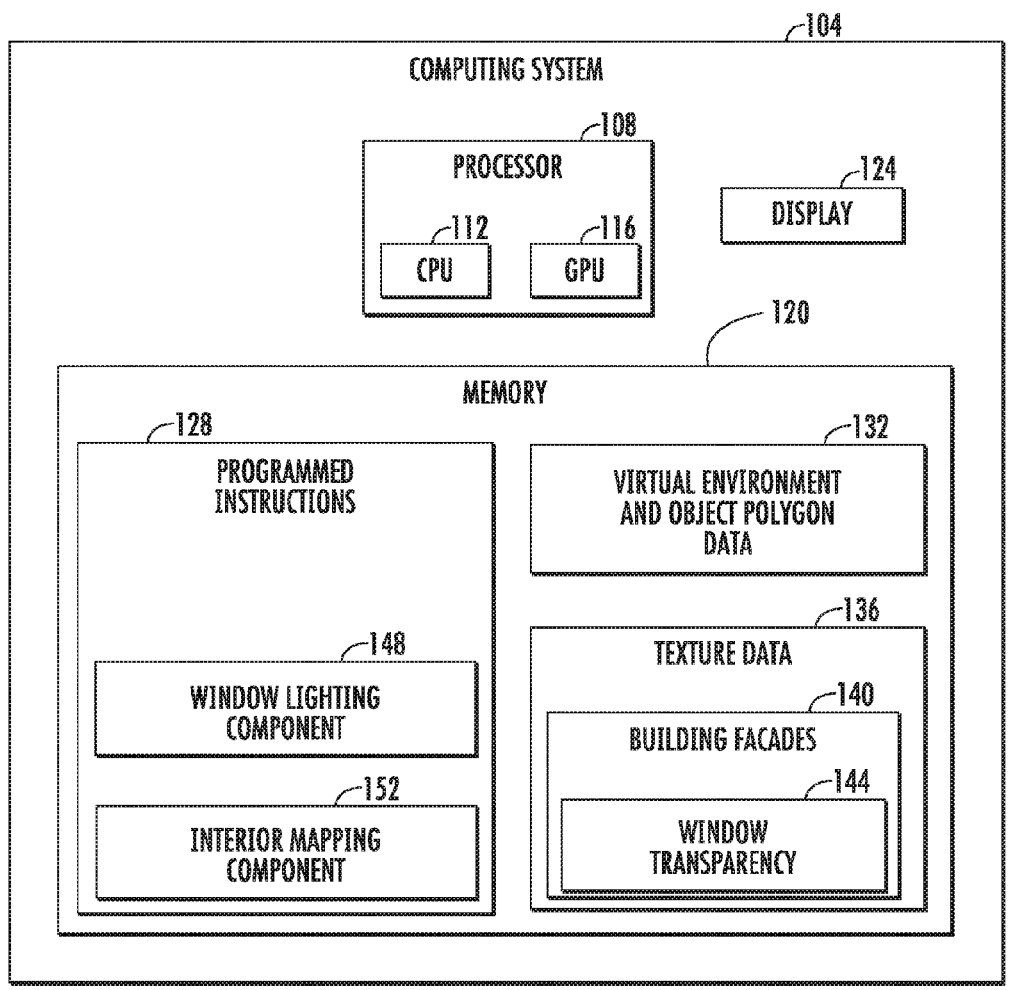
FIG. 1 shows a computing system for generating window effects in urban scene rendering.

For a general understanding of the environment for the system and methods disclosed herein as well as the details for the system and methods, reference is made to the drawings. In the drawings, like reference numerals designate like elements.

FIG. 1 depicts a computing system 104 that generates a graphical display of a 3D virtual environment including a representation of ground, such as the surface of the Earth, and one or more buildings or other structures. The computing system 104 includes a processor 108, memory 120, and a display 124. In one embodiment, the computing system 104 is an in-vehicle information system that is used for the display of 3D graphics in conjunction with operation of the vehicle. In other embodiments, the computing system 104 is an embedded system or a mobile electronic device. Hardware embodiments of the computing system 104 include, but are not limited to, personal computer (PC) hardware, embedded system hardware including embedded computing hardware for use in a motor vehicle, and mobile electronic devices including smartphone and tablet computing devices.

In the computing system 104, the processor 108 includes one or more integrated circuits that implement the functionality of a central processing unit (CPU) 112 and graphics processing unit (GPU) 116. In some embodiments, the processor 108 is a system on a chip (SoC) that integrates the functionality of the CPU 112 and GPU 116, and optionally other components, including the memory 120, into a single integrated device. In one embodiment, the CPU is a commercially available central processing device that implements an instruction set such as one of the x86, ARM, Power, or MIPS instruction set families. The GPU 116 includes hardware and software for display of both 2D and 3D graphics. In one embodiment, processor 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement geometry shaders, fragment shaders, and vertex shaders for the processing and display of 2D and 3D graphics. During operation, the CPU 112 and GPU 116 execute stored programmed instructions 128 that are retrieved from the memory 120. In one embodiment, the stored programmed instructions 128 include operating system software and one or more software application programs that generate 3D graphics, including mapping and navigation applications, virtual reality applications, game applications, simulation applications, and any other software that is configured to generate 3D graphics. The processor 108 executes the 3D graphics application and generates 2D and 3D graphical output corresponding to the 3D virtual environment through the display device 124. The display 124 is configured to receive rendered images from the processor 108 and to display the rendered images. The processor 108 is configured with software and hardware functionality by storing the programmed instructions 128 in one or more memories operatively connected to the processor 108 and by operatively connecting the hardware functionality to the processor.

The memory 120 includes both non-volatile memory and volatile memory. The non-volatile memory includes solid-state memories, such as NAND flash memory, magnetic and optical storage media, or any other suitable data storage device that retains data when the computing system 104 is deactivated or loses electrical power. The volatile memory includes static and dynamic random access memory (RAM) that stores software and data, including graphics data and map feature data, during operation of the computing system 104. In addition to the programmed instructions 128, the memory 120 includes virtual environment and object polygon data 132 and texture data 136. The virtual environment and object polygon data 132 includes a model of a virtual environment with ground terrain information, coordinates and orientation data for multiple buildings or other structures that are located in the virtual environment. The virtual environment and object polygon data 132 includes vertices with three-dimensional coordinates that define a series of interconnected polygons, such as triangles, that form the shape of the buildings or other structures in the 3D virtual environment.

In the memory 120, the texture data 136 include a plurality of textures, which are typically 2D images. The texture data 136 includes building facade textures 140. The building facade textures 140 have texture coordinates (u, v) and each floor of the building facade corresponds to a unique vertical range of the vertical texture coordinate (v). In some data sources, building facade textures comprise repeating textures that are addressed such that each floor of the building does not have a unique vertical range. In this these cases, the processor 108 converts the repeating texture addresses to unique vertical ranges for each floor of the building. The building facade 140 textures further include a window transparency cutout layer 144 that marks window areas in the building facade textures 140 as transparent. The texture data 136 also includes one or more interior cube map textures 148 that represent room interiors and one or more furniture plane textures.

The computing system 104 is configured to perform a method for automatically rendering random window lighting and interior maps without explicit information of room sizes and locations. The programmed instructions 128 comprise computer code that implements the method and at least includes a window lighting component 152 that automatically renders window lighting. In some embodiments the programmed instructions 128 further includes an interior mapping component 156 that automatically renders interior textures of rooms. One aspect of the method is that the method infers room locations based on texture coordinates of the facades. In some embodiments, the GPU 116 is configured to perform all the computation for this method at runtime in a pixel shader, which is also referred to as a fragment shader in some embodiments. Therefore, the method does not require pre-computing either the geometry or location of rooms, and it easily scales to handling scenes of arbitrary sizes.

In one embodiment, the GPU 116 is configured to perform the method using only fragment shaders. Therefore, the method is easily integrated into existing forward or deferred renderers. In one embodiment, The interior mapping component 156 is selectively applied statically or dynamically based on level of detail needed. As compared to previous methods, this process does not require pre-computing or storing extra data per building, and is applied directly to buildings of different shapes and internal structures. Since the method is essentially an image-based approach, it is natively scalable to handle large city data without affecting performance.

Figure 2:
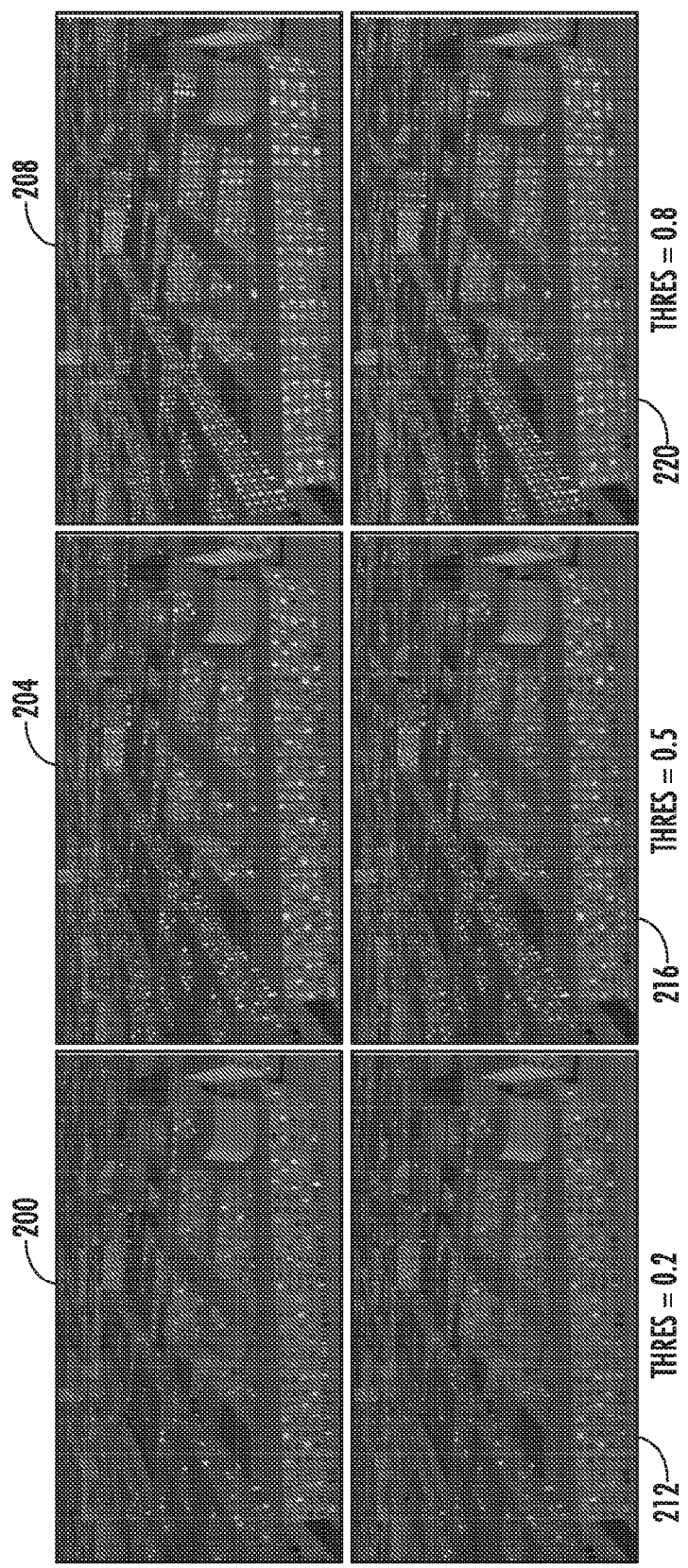
FIG. 2 shows a comparison of window lighting and interior mapping effects having various window light percentages.

FIG. 2 shows a comparison of window lighting and interior mapping effects created with the method having various window light percentages. In this overview perspective, the processor 108 uses window lighting component 152 to generate two color lighting on a random set of windows and provides a convincing rendering of a city night scene. A threshold parameter controls the portion of lit windows. The percentage of lit rooms is controlled using the threshold parameter in a continuous way. Renderings 200, 204, and 208 depict a city rendered with window light using threshold parameter values of 0.2, 0.5, and 0.8, respectively. In some embodiments, the processor 108 uses the interior mapping component 156 to add further variety to the windows' appearance by rendering interior textures. Renderings 212, 216, and 220 depict the city rendered to further include interior mapping. Note that the transition when the threshold parameter is adjusted resembles the effect of sliding the window curtains. This effect is not noticeable when the transition happens slowly, and is more favorable than abruptly turning individual lights on and off, which may introduce distractions in many applications.

Figure 3:
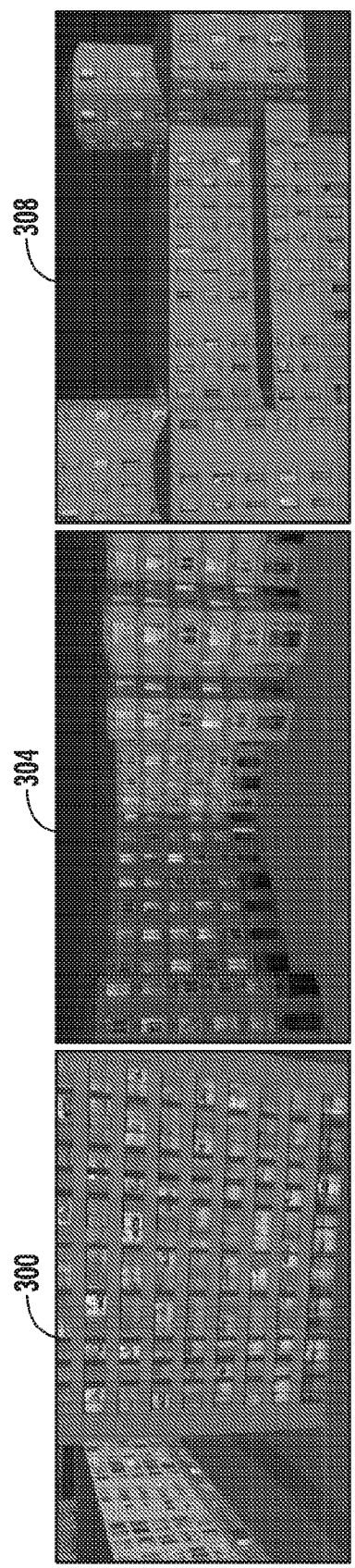
FIG. 3 shows additional close up views with interior mapping.

FIG. 3 shows additional close up views 300, 304, and 308 with interior mapping and demonstrates that the method works well with complex building shapes. Since room locations are inferred solely from texture coordinates, the method can be applied to any combination of planar facades, as long as windows do not cross texture boundaries.

FIGS. 4a and 4b depict two facade parameterization processes, 400 and 404, for the window lighting component 152 that use texture coordinates of the building facades to define rooms and floors. The parameterization processes 400 and 404 can be used to randomly light a subset of rooms in a scene, with optionally varying lighting styles.

Figure 5A:
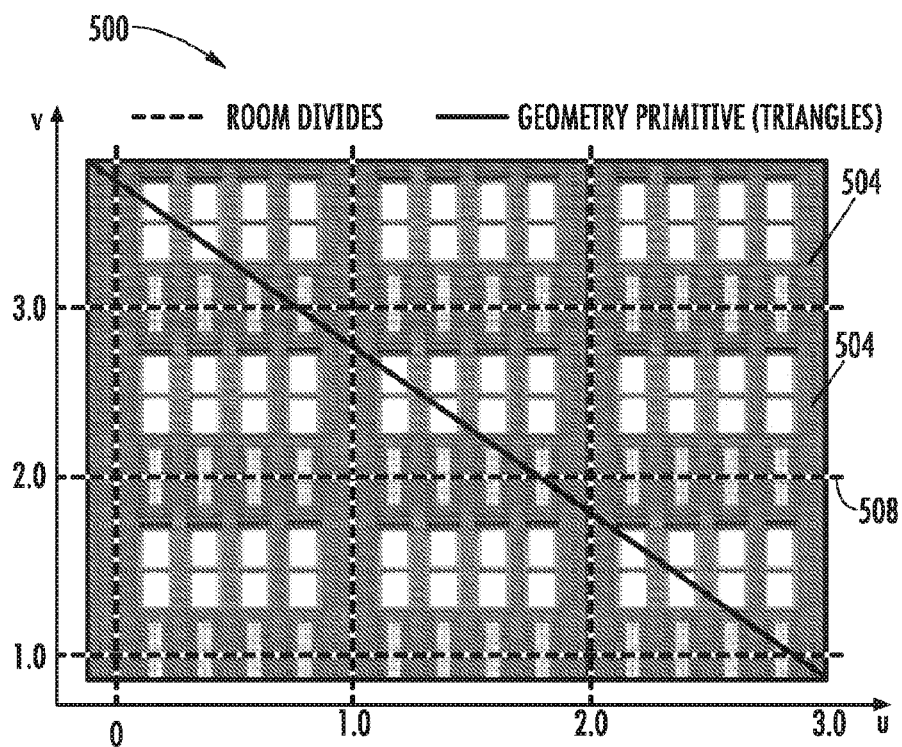
FIGS. 5*a-b* show building facades parameterized using the process of FIG. 4*a*.
Figure 5B:
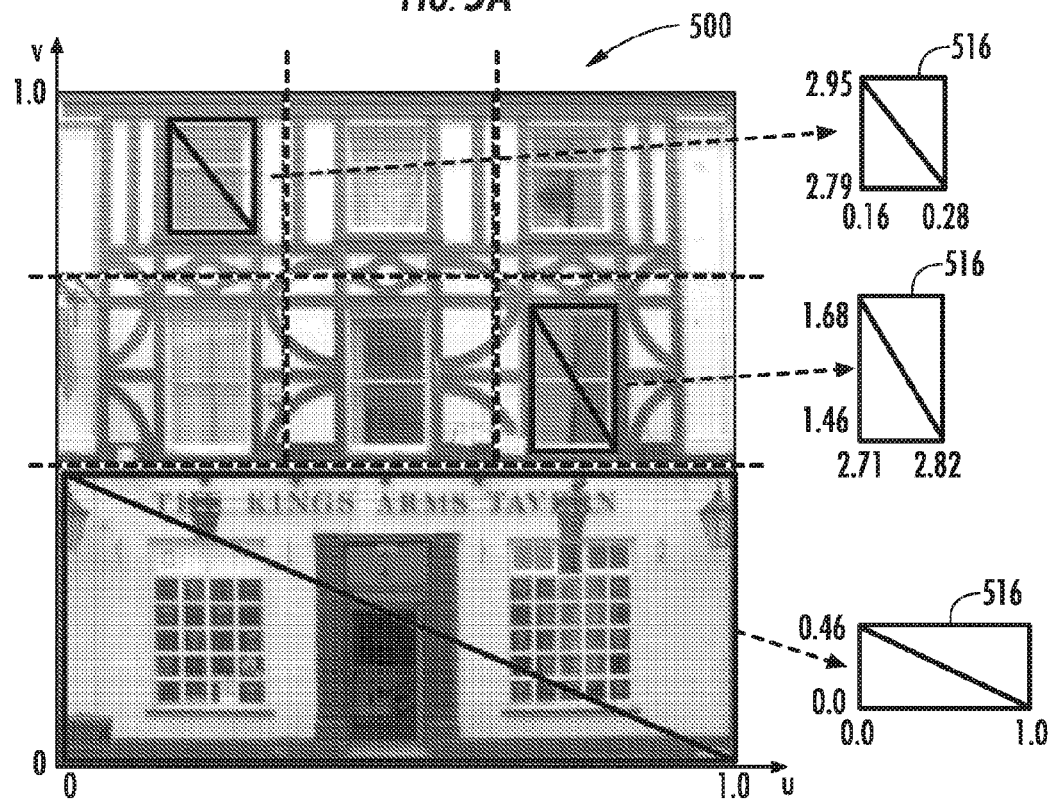

FIG. 4a depicts the parameterization process 400 for parameterizing a building facade and applying window lighting. First, the process 400 uses the processor 108 to identify room boundaries based on the marked window areas of a building facade texture using the vertical and horizontal texture coordinates (u, v) (block 408). FIG. 5a depicts a case in which a building facade texture 500 comprises repeating textures 504. In this case, the process 400 assumes that each integer range of the repeated textures 504 defines the boundaries of a room. The processor 108 computes a unique range of texture coordinates for each room in the building facade 500, shown by dashed lines 508. For example, to define a facade with n by m uniformly distributed rooms, a single quad can be drawn and texture coordinates can be assigned from 0 to n in one direction and 0 to m in the other direction. However, in other embodiments, rooms are placed in arbitrary locations with flexible combinations of sizes and shapes, the windows belonging to each room being within the designated texture coordinate range. FIG. 5b depicts an arbitrary room distribution on a building facade 512 with a single texture. The processor 108 computes a unique integer coordinate range 516 for each room, with the fractional part of (u, v) representing the true texture coordinate. On the top two floors, only window areas have geometry primitives and texture coordinates defined using the process. On the bottom floor, the entire room area is covered with a pair of triangle geometry primitives.

Next, the process 400 identifies rooms to be lit (block 412). To light a random set of rooms, the processor 108 uses a 2D lighting function to compute a value between 0 and 1 for each room based on the integer parts of (u, v). The processor 108 then compares the value returned from this function with the threshold value to determine if the room is lit or not. The threshold value may be dependent on a time of day. In some embodiments, to avoid a harsh transition between lit and unlit, the processor 108 uses an interpolation function to gradually turn the lighting on or off as the threshold value changes over time. In one embodiment, the interpolation function is an OpenGL smoothstep function. In one embodiment, to add variation per building, the processor 108 adds a third parameter to the lighting function which is a unique ID per building so that buildings using the same geometry will have different patterns of lit rooms.

Finally, the process 400 maps the computed room lighting to the transparent window areas of the building facade texture (block 416). The processor 108 applies the window transparency cutout layer 144 to the building facade texture to mark window locations with an alpha value of zero. The processor 108 then combines the inverse of this alpha value with the computed room lighting so that room lighting only affects transparent window areas.

FIG. 4b depicts another process 404 for parameterizing a building facade and applying window lighting. The parameterization process 400, described above, allows for a precise definition of room boundaries. However, with the process 400, either the same texture is repeated for all rooms, as in FIG. 5a, or separate geometry is generated for each room or window, as in FIG. 5b. The process 404 provides a more flexible method. First the process 404 uses the processor 108 to define a single texture coordinate range 600 covering an entire floor and to repeat it vertically for the whole building facade, as shown in FIG. 6a (block 420). In this way, the process 404 improves the variety in the facade appearance while keeping the geometry simple. Note that this parameterization does not prevent repeating the texture coordinate ranges horizontally or lining up multiple textures coordinate ranges on each floor. The only change is that an integer range of the horizontal texture coordinate range now accommodates multiple rooms.

Next, the process 404 applies a pseudo-random curtain function and threshold to the lighting on each floor (block 424). With the floor boundaries, the processor 108 introduces a pseudo-random window curtain function and threshold to generate variances of lighting among different windows on each floor. The processor 108 evaluates the function per pixel using the horizontal texture coordinate ranges and compares its value to a threshold value to determine if the pixel is lit or unlit Like the in the process 400, in some embodiments of the process 404, the processor 108 uses an interpolation function to blend between lit and unlit values and uses the alpha channel to mark window pixels. FIG. 6b shows an exemplary pseudo-random window curtain function 604 and threshold value 608. In some embodiments, the processor 108 uses a floor index to shift the pseudo-random function between floors to give a more random appearance to the pattern of lit and unlit windows. In some embodiments, to avoid neighboring buildings having the same pattern of lit and unlit windows, the processor 108 also passes in an index per facade texture to further shift the pseudo-random function. For example, in one embodiment, the processor 108 implements the following function:

$$x = t_x + \text{floor}(t_y) + b$$

$$f_{lit} = \cos(2(\pi \sin(5x) + \sin(2x)))$$

$$\text{lit} = \text{smoothstep}(\text{thres}, \text{thres}+0.2, f_{lit}) \qquad (1)$$

where $t_x$ and $t_y$ are the x and y components of the (u, v) texture coordinate t and b is the optional building index. The value thres is the threshold for controlling the percentage of lit windows. The value thres may be dependent on a time of day. The smoothstep( ) function is the OpenGL Hermite interpolation function. FIG. 6c shows the lit value 612 computed for the facade of FIG. 6a with thres equal to 0.4.

After the window lighting has been generated, the process 404 uses the processor 108 to combines the computed window lighting with the building facade texture such that the window lighting can be seen through the transparent window areas of the building facade texture (block 428). FIG. 6d shows the computed window lighting applied to the facade of FIG. 6a. Note that the window curtain function creates a virtual separation of rooms within each floor.

To add more variety to the window lighting, in some embodiments, the processor 108 applies two different user-defined light colors to the window lighting pattern. The processor 108 uses a second pseudo-random function to switch between these light colors. To avoid unrealistic sharp transition of colors, the processor 108 applies an interpolation function to blend between them. For example, in one embodiment, the processor 108 uses following function as a light color function:

$$y = \text{floor}(t_y) + b$$

$$f_{blend} = \sin(19(t_x + 10y)) + \sin(35t_x + 10y)$$

$$c = \text{mix}(c_1, c_2, \text{smoothstep}(-0.3, 0.3, f_{blend})) \qquad (2)$$

where $c_1$ and $c_2$ are two alternative light colors, and c is the resulting window color. The mix( ) function is the OpenGL linear interpolation function. Note that the two random functions $f_{lit}$ and $f_{blend}$ have different oscillation frequencies. This difference works because having color change in the middle of a lit window simulates interaction of multiple light sources within the room. FIG. 6e shows the facade of FIG. 6a with two colors of window light.

In real city scenes rooms may contain lights of different brightness. To simulate this effect, in some embodiments, the processor 108 uses a third pseudo-random function to modulate the brightness of the light, such as:

$$\text{brightness} = 0.8 + 0.4 \cos(1.5(\pi \sin(7t_x) + \sin(3x))) \qquad (3)$$

where the value of brightness is in the range of 0.4 to 1.2, so it can either increase or decrease the amount of light. FIG. 6f shows the facade of FIG. 6a with two colors of window light and varying brightness.

Figure 7:
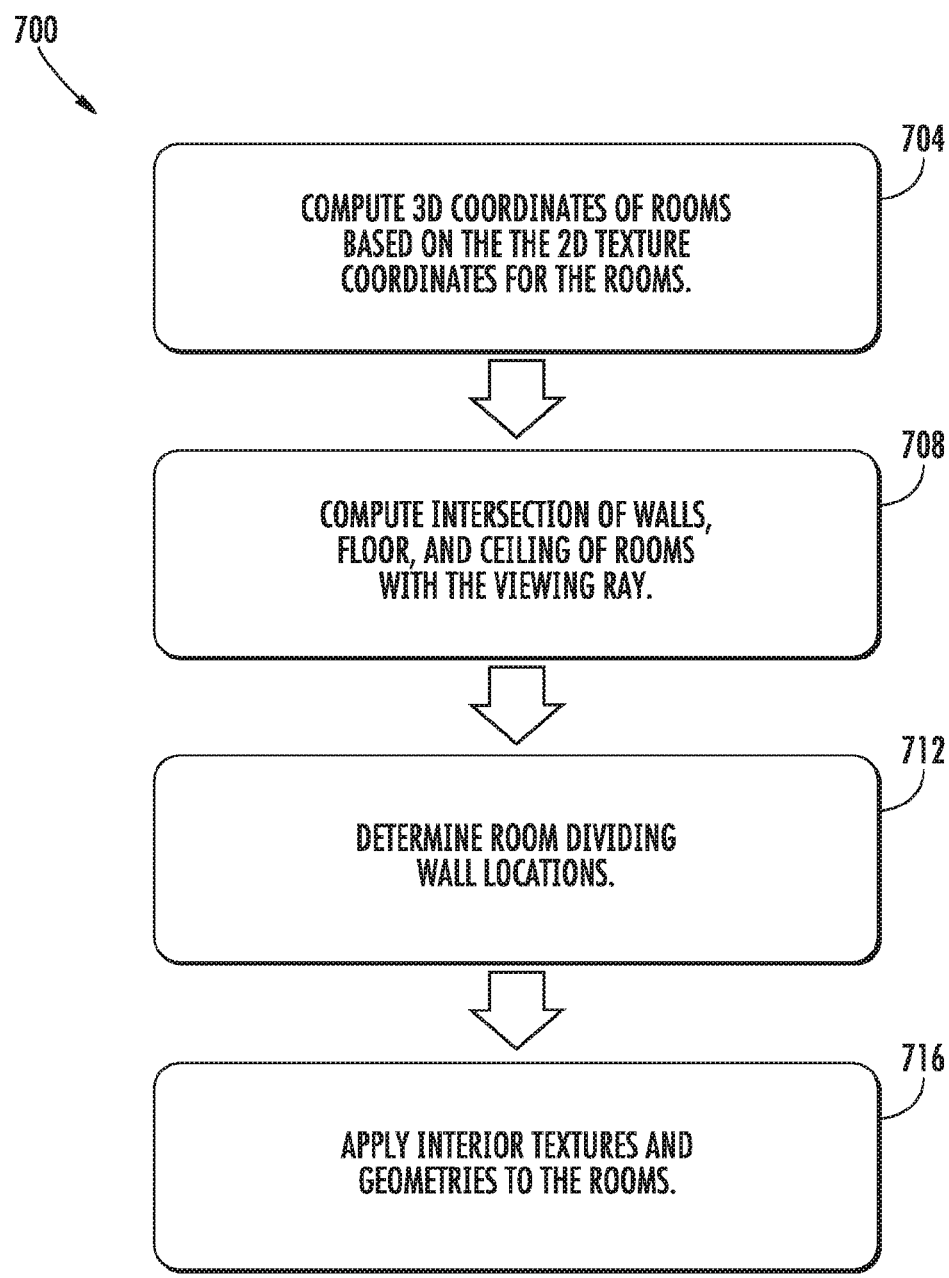
FIG. 7 shows an interior mapping process for the interior mapping component.

FIG. 7 depicts an interior mapping process 700 for the interior mapping component 156 that is used by the processor 108 to determine world space coordinates for rooms and to fill the rooms with random interiors. These world space coordinates are then combined with an interior mapping algorithm to render room interiors represented by a cube map. In some embodiments, after the processor 108 has performed a process of the window lighting component 152 to determine room locations in the 2D building facade textures, the processor 108 uses the process 700 of the interior mapping component 156 to add interior view behind the view, executed in the same fragment shader.

Figure 8:
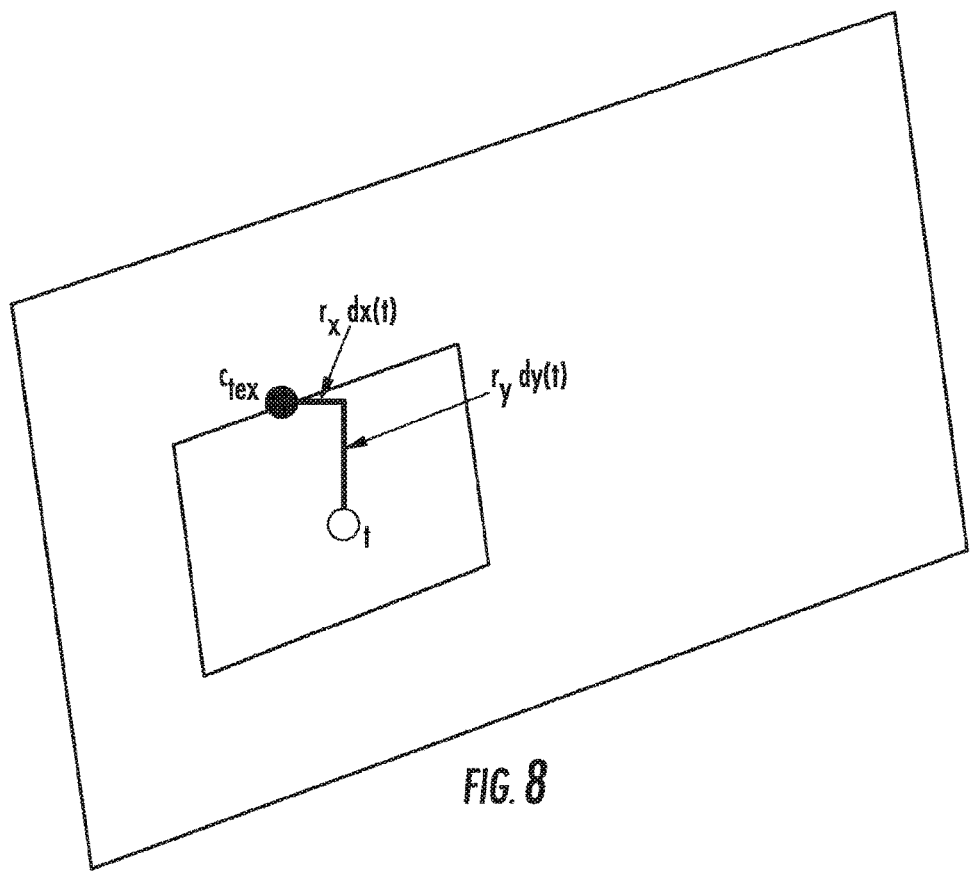
FIGS. 8*a-c* show interiors mapped using the process of FIG. 7.

First, the process 700 determines room floor, ceiling, and wall locations in texture space for a room that contains the current fragment (block 702). In the case where the process 400 was used to individually define room locations, the processor 108 simply determines that the room boundaries are located at nearest integer values in u-v texture space. However, in the case where the per-floor texture parameterization process 404 was used, the processor 108 uses a pseudo-random placement of room dividing walls based on the window curtain function that was used in the process 404. The processor 108 uses the window lighting pattern generated with the window curtain function as a loose definition of room separation. To apply interior mapping to the rooms, the processor 108 defines precise definitions of wall. In one embodiment, the processor 108 uses the minimums of the pseudo-random window curtain function to define the boundaries of the rooms. By placing walls at the locations of the minimums of this function the probability that the dividing wall will appear in the middle of a lit window is reduced. Even if the dividing wall is in the middle of a window, this portion of the window would generally not be lit except in the case where the lit threshold is set to 100%. FIG. 8a shows an example of walls placed using this method. FIG. 8b shows the window curtain pattern applied to the interior texture. Note that the window curtains have the positive side effect of hiding room transitions. FIG. 8c shows the building facade texture combined with interior and window curtain rendering.

With irregularly spaced walls, the processor 108 uses an efficient method to determine in which room given texture coordinates lie. The processor 108 stores the locations of the walls in a 1D texture in the memory 120 such that given a horizontal texture coordinate, the processor can determine the locations of the side walls between which the coordinate falls. In one embodiment, for mobile platform compatibility, the processor 108 uses an RGB 8 bit per channel texture to encode the wall locations, which means that the processor 108 must scale the wall location values to a zero to one range. Since the pseudo-random function has a period of $2\pi$, the processor 108 first divides all of the wall locations by $2\pi$. Then, the processor 108 iteratively fills in the values of the texture such that for a texture of size n the value at index i is the location of the walls $w_j$ and $w_{j+1}$ where $$\frac{w_j}{2\pi} \le \frac{i}{n} \text{ and } \frac{w_{j+1}}{2\pi} > \frac{i}{n}.$$

In the red channel, the processor 108 stores $$\frac{w_j}{2\pi}.$$

In the green channel, the processor 108 stores $$\frac{w_{j+1} - w_j}{2\pi}.$$

Figure 9:
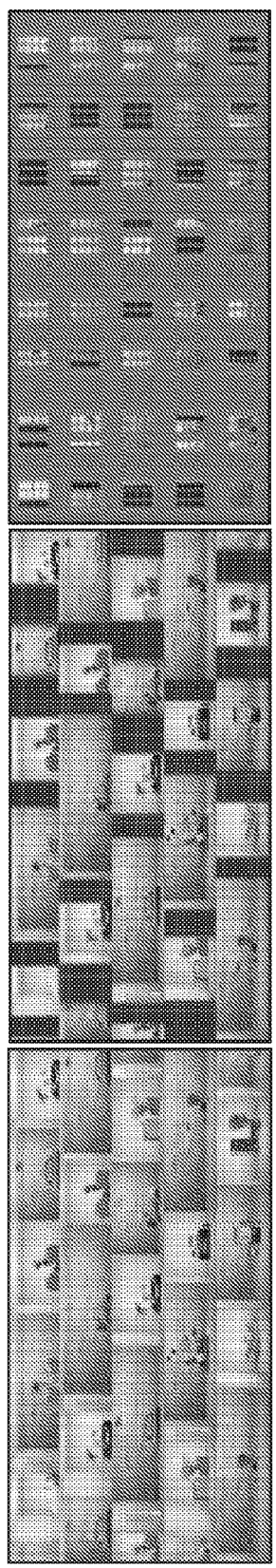
FIG. 9 shows an example encoding of wall locations in an RBG 8 bit per channel texture.

In the blue channel, the processor 108 stores the index i of the room. Since the pseudo-random function does not have a wall located at 0, the first wall location is negative. Accordingly, the processor 108 subtracts the value of the first wall from all each of the wall locations to ensure that all values stored in the texture are positive. FIG. 9 shows an example encoding of wall locations in a texture. In this example, the wall locations in texture space are shown with the lines 900. The top row of data 904 corresponds to the red channel data in which the location of the left wall is stored. The middle row of data 908 corresponds to the green channel data in which the width of the room is stored. Finally, the bottom row of data 912 corresponds to the blue channel data in which the index of the room is stored.

The processor 108 uses a fragment shader of the GPU 116 to perform the reverse of this encoding operation to get back the location of the walls in texture space. Because the wall definition is periodic, the processor 108 shifts the texture coordinates to be in the range of 0 to $2\pi$ and scales it to the zero to one range. The processor 108 then retrieves a value wt from the wall texture and uses it to define the locations of the left and right walls as follows:

$$w_{left} = 2\pi wt_r + \text{offset} \quad (10)$$

$$w_{right} = w_{left} + 2\pi wt_g$$

where $wt_r$ and $wt_g$ are the red and green components of a texel. The processor 108 uses the values $w_{left}$ and $w_{right}$ in the equations described above to compute the world space positions from the texture coordinates.

Next, the process 700 computes the 3D world space coordinates for the room that the current fragment is located in based on the room coordinate ranges for the 2D building facade textures (block 708). The processor 108 defines a mapping between texture space and world space on a per-facade basis. In one embodiment, fragment shaders of the GPU 116 finds world space positions of the room boundaries by using a screen space derivative function. The processor 108 uses the world space position p and the texture coordinate t for the current pixel on the window to evaluate the relationship between world space and texture space. The relationship between world space and texture space can be expressed between the current window pixel and another point on the facade with texture coordinate t' and unknown world space position p' using the screen space derivatives as follows:

$$t' = t + r_x dx(t) + r_y dy(t)$$

$$p' = p + r_x dx(p) + r_y dy(p) \quad (4)$$

where dx and dy are the screen space derivative operators. FIG. 10 illustrates this relationship between the screen space derivatives and the change in world space and texture space coordinates.

Next, the process 700 uses the processor 108 to compute the intersection of the walls, floor, and ceiling of the rooms with the viewing ray in world space (block 712). The viewing ray is a function of a viewing angle of the three-dimensional building and the window areas of the building facade texture. To solve the ray-plane intersection equation the processor 108 must identify a point on the plane and the normal to the plane. For example, in one embodiment, to determine a point on the ceiling plane with vertical texture coordinate n directly above the current window pixel (u, v), the processor 108 assumes that the buildings are pre-transformed such that the normal to the ceiling plane is <0, 1, 0>. The processor 108 directly plugs these values into the plane equation below to find the intersection point between the view ray v and the ceiling.

$$t_{ceiling} = \frac{(p' - p) \cdot \langle 0,1,0 \rangle}{v \cdot \langle 0,1,0 \rangle} \quad (5)$$

This equation can be simplified with the observation that $p' - p$ is equal to $r_x dx(p) + r_y dy(p)$. Therefore, there is no need to explicitly solve for p'. Additionally, because the plane normal is assumed to be <0, 1, 0>, only the y component is required for the computation. These observations and Equation 4 result in the following formula with which the processor 108 can compute $t_{ceiling}$:

$$dfc = \frac{dx(t)_u dy(p)_y - dy(t)_u dx(p)_y}{dx(t)_u dy(p)_v - dy(t)_u dx(t)_v} \quad (6)$$

$$dv = \frac{dfc}{v_y}$$

$$t_{ceiling} = (n - v)dv$$

By extension, the processor 108 can compute the intersection point between the floor, with texture coordinate (u, m) and the view ray as follows:

$$t_{floor} = (m-v)dv \quad (7)$$

The processor 108 computes the intersection point for the side walls using a similar computation. However, not a single normal vector for the side walls applies to all buildings. Assuming rectilinear buildings the processor 108 can compute the normal to the side walls $n_s$ by taking the cross product of the facade normal $n_w$ and the ceiling normal <0, 1, 0>. Using Equation 4 the following equation for the intersection point results:

$$d = \frac{dx(t)_v dy(p) - dy(t)_v dx(p)}{dx(t)_v dy(t)_u - dy(t)_v dx(t)_u} \quad (8)$$

$$dv = \frac{d \cdot n_s}{v \cdot n_s}$$

$$t_{wall} = (j-u)dv$$

where j is the x component of the texture coordinate of the side wall boundary.

The processor 108 computes the intersection point of the view ray with the back wall without reliance on screen space derivatives. In this case, the processor 108 assumes that the back wall is parallel to the facade geometry and that the back wall has the same normal vector as the facade $n_w$. To determine the location of the back wall the processor 108 defines an offset in world space $b_{off}$ from the facade. The intersection location is then defined as follows:

$$t_{back} = b_{off} \frac{n_w \cdot n_w}{v \cdot n_w} \quad (9)$$

Next, the process 700 uses the processor 108 to apply interior textures and geometries to the rooms (block 716). After the processor 108 has computed the view ray intersections with the walls, floor, and ceiling, it computes the value of the closest non-negative ray parameter t and determines its relative location within the cube map. For each pair of parallel walls only one of the intersection values with the view ray will be positive since the ray origin is the point on the facade which lies within the room span. Therefore, for each pair of parallel walls, processor 108 takes the larger of the two intersection values. The processor 108 is left with three intersection points, the closest of which is the minimum, since none are negative. These points result in the world space coordinates of the intersection point of p+t v. To perform the interior mapping, the processor 108 constructs a ray from the center of the room to the intersection point to use as a look-up ray for the cube map texture. The processor 108 does not need an explicit world space position for the center of the room. The processor 108 generates the center at (0, 0, 0), in cube map coordinates. The processor 108 computes the relative position of the intersection point in each dimension by finding its relative position between each pair of walls. Since cube map coordinates range from −1 to 1, the processor 108 rescales the current texture coordinates to the 0 to 1 range and additionally defines the facade as having a z texture coordinate of −1 and the back wall with a z texture coordinate of 1. By reusing the ratios of texture coordinate space in the world space, the processor 108 avoids conversions of coordinates to world space. In one embodiment, the processor uses the following equations for the cube map look-up ray:

$$cx = \frac{2\frac{tv_{xz} \cdot d_{xz}}{\|d_{xz}\|} - (w_{left} + w_{right} - 2u)}{(w_{right} - w_{left})} \quad (11)$$

$$cy = 2\left(\frac{tv_y}{dfc} - (m-v)\right) - 1$$

$$cz = 2\frac{tv_{xz} \cdot w_{nxz}}{b_{off}} - 1$$

using the same definitions as in Equations 6, 8, and 9. The processor 108 then uses the vector <cx, cy, cz> as the direction for the look-up in the cube map.

In some embodiments, when using a small number of cube map textures, the processor 108 adds additional variety to the interiors to increase the appearance of randomness. The processor 108 combines the room index loaded from the wall location texture with the floor ID floor($t_y$) to form a unique room ID for each room on a facade. In some embodiments, the processor 108 then uses the pseudo-random function of the room ID to randomly flip front and back walls. This process takes advantage of the fact that, even though a cube map has 6 faces, only 5 of them are seen. In some embodiments, the processor 108 also uses the room ID to randomly flip between the two light colors $c_1$ and $c_2$ on a per-room basis, instead of using Equation 2 to blend them. In some embodiments, the processor 108 also introduces a furniture plane parallel to the back wall, by randomly selecting furniture textures from a texture atlas.

Since the wall placement process allows for arbitrarily placed walls, the rooms often end up with different aspect ratios for the back wall. A simple way to avoid apparent texture stretching in this case is to avoid having any features with recognizable shapes in back wall textures. Instead, any features with recognizable shapes can be put in furniture textures, which are not stretched. Alternatively, since the aspect ratio of each room can be easily computed in the shader, in some embodiments, the processor 108 uses it to dynamically select from different cube maps or front and back textures, which are designed for showing at different aspect ratios.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the disclosure.

The invention claimed is:

1. A method of rendering a three-dimensional building with window effects, the method comprising:
   reading, with a processor, a building facade texture for the three-dimensional building from a memory that is operably connected to the processor, the building facade texture including a window transparency cutout layer that marks window areas of the building facade texture as transparent;
   identifying, with the processor, floor boundaries within the building facade texture based on window areas of the building facade texture, the identified floor boundaries being unique two-dimensional texture-space coordinate ranges within the building facade texture that correspond to individual floors within the three-dimensional building;

generating, with the processor, a window lighting layer for the building facade texture using the identified floor boundaries, the generating of the window lighting layer further comprising:

identifying portions of each of the individual floors to be lit by comparing a first pseudo-random function with a threshold value, the first pseudo-random function being evaluated for each pixel along a horizontal axis of each of the individual floors, a pixel along the horizontal axis being lit if the first pseudo-random function is greater than the threshold value and unlit if the first pseudo-random function is less than the threshold value; and generating the window lighting layer with lit areas corresponding to the identified portions of each of the individual floors to be lit;

generating, with the processor, a modified building facade texture having window effects by combining the window lighting layer with the building facade texture using the window transparency cutout layer, the modified building facade texture being configured such that the window lighting layer can be seen only through the window areas of the building facade texture; and rendering, with the processor, images of the three-dimensional building using the modified building facade texture.

2. The method according to claim 1, wherein the threshold value is dependent upon a time of day.

3. The method according to claim 1 further comprising:

determining, with the processor, texture-space locations of walls, floors, and ceilings of individual rooms of the individual floors, the texture-space locations of the floors and the ceilings being determined based on the identified floor boundaries, the texture-space locations of the walls being determined using the first pseudo-random function, the texture-space locations of the walls, the floors, and the ceilings defining the individual rooms of the three-dimensional building;

computing, with the processor, three-dimensional world-space coordinate ranges of the individual rooms based on the determined texture-space locations of the walls, the floors, and the ceilings;

computing, with the processor, intersections of the walls, the floors, and the ceilings of the individual rooms with a viewing ray, the viewing ray being a function of a viewing angle of the three-dimensional building and the window areas of the building facade texture;

reading, with the processor, interior textures and geometries from the memory; and applying, with the processor, the interior textures and the geometries to the individual rooms using the computed intersections of the walls, the floors, and the ceilings of the individual rooms with the viewing ray.

4. The method according to claim 1 further comprising:

sending the rendered images of the three-dimensional building to a display that is operably connected to the processor, the display being configured to display the rendered images of the three-dimensional building.

5. The method according to claim 1, wherein the window lighting layer includes at least two lighting colors.

6. The method according to claim 5, wherein the at least two lighting colors are applied randomly to the at least one of individual rooms and individual floors using a second pseudo random function.

7. The method according to claim 5, wherein the at least two lighting colors are blended in some portions of the window lighting layer.

8. The method according to claim 1, wherein a brightness of the window lighting layer is randomly modulated across different portions of the window lighting layer using a third pseudo random function.

9. A system for rendering a three-dimensional building with window effects, the system comprising:

a display configured to display rendered images of the three-dimensional building;

a memory configured to store program instructions and a building facade texture for the three-dimensional building, the building facade texture including a window transparency cutout layer that marks window areas of the building facade texture as transparent; and a processor operably connected to the display and the memory, the processor being configured to execute the programming instructions to:

read the building facade texture from the memory;

identify floor boundaries within the building facade texture based on window areas of the building facade texture, the floor boundaries being unique two-dimensional texture-space coordinate ranges within the building facade texture that correspond to individual floors within the three-dimensional building;

generate a window lighting layer for the building facade texture using the identified floor boundaries, the window lighting layer being generated by:

identifying portions of each of the individual floors to be lit by comparing a first pseudo-random function with a threshold value, the first pseudo-random function being evaluated for each pixel along a horizontal axis of each of the individual floors, a pixel along the horizontal axis being lit if the first pseudo-random function is greater than the threshold value and unlit if the first pseudo-random function is less than the threshold value; and generating the window lighting layer with lit areas corresponding to the identified portions of each of the individual floors to be lit;

generate a modified building facade texture having window effects by combining the window lighting layer with the building facade texture using the window transparency cutout layer, the modified building facade texture being configured such that the window lighting layer can be seen only through the window areas of the building facade texture; and render images of the three-dimensional building using the modified building facade texture.

10. The system of claim 9, wherein the system an in-vehicle information system.

11. The system of claim 9, wherein the system is at least one of a mobile phone and a tablet computer.

12. The system of claim 9, wherein the processor includes an integrated CPU and GPU.

* * * * *